United States Patent
Görbing et al.

(10) Patent No.: US 12,328,183 B2
(45) Date of Patent: Jun. 10, 2025

(54) METHOD FOR AVOIDING FUNCTION DISABLEMENTS FOR INTELLIGENT ELECTRONIC UNITS

(71) Applicant: Siemens Aktiengesellschaft, Munich (DE)

(72) Inventors: Andrej Görbing, Berlin (DE); Ji Chen, Nanjing (CN); Stefan Flemming, Rosstal-Buchschwabach (DE); Igor Kogan, Berlin (DE); Oliver Lindner, Finowfurt (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/796,558

(22) Filed: Aug. 7, 2024

(65) Prior Publication Data

US 2025/0055586 A1     Feb. 13, 2025

(30) Foreign Application Priority Data

Aug. 7, 2023   (EP) .................................. 23190098.6

(51) Int. Cl.
| | |
|---|---|
| *H04J 3/06* | (2006.01) |
| *H04W 56/00* | (2009.01) |
| *H04W 84/12* | (2009.01) |

(52) U.S. Cl.
CPC .......... *H04J 3/0641* (2013.01); *H04J 3/0667* (2013.01); *H04W 56/0015* (2013.01); *H04W 84/12* (2013.01)

(58) Field of Classification Search
CPC . H04J 3/0641; H04J 3/0067; H04W 56/0015; H04W 84/12
See application file for complete search history.

(56) References Cited

U.S. PATENT DOCUMENTS

| | | | |
|---|---|---|---|
| 2004/0044799 A1* | 3/2004 | Sivaraman | G06F 16/27 709/253 |
| 2012/0278421 A1* | 11/2012 | Sun | H04Q 9/00 709/208 |

(Continued)

OTHER PUBLICATIONS

"IEEE Standard Profile for Use of IEEE 1588 Precision Time Protocol in Power System Applications; IEEE Std C37.238-2017 (Revision of IEEE Std C37.238-2011"; IEEE Standard; published: Jun. 17, 2017; pp. 1-42; XP068114900; DOI: 10.1109/IEEESTD.2017.7953616; ISBN: 978-1-5044-2326-7.

(Continued)

*Primary Examiner* — Mohammad S Anwar
(74) *Attorney, Agent, or Firm* — Laurence A. Greenberg; Werner H. Stemer; Ralph E. Locher

(57) ABSTRACT

A method for avoiding function disablements of intelligent electronic units IEDs that are connected in a local network which has at least two timing units. One of the timing units assumes an active grandmaster role as a synchronization source while the other timing units remain in their slave state and synchronize with the timing unit in the grandmaster role. When one of the timing units changes from the slave state to the grandmaster role, a pre-synchronization message is used to notify all IEDs in the local network whether and, if applicable, with which previous grandmaster timing unit the present grandmaster timing unit was synchronized. This avoids a disablement of the function of the IEDs that generate or process data streams whose samples have been acquired in sync with the previous grandmaster timing unit.

13 Claims, 2 Drawing Sheets

(56) References Cited

U.S. PATENT DOCUMENTS

2014/0281037 A1    9/2014   Spada et al.
2018/0109369 A1    4/2018   Hamour et al.

OTHER PUBLICATIONS

Whitehead, Michael et al.; "Validation Testing of IEC 61850 Process Bus Architecture in a Typical Digital Substation"; 2021 74th Conference for protective relay engineers; published: Mar. 22, 2021; pp. 1-9; XP033915260; DOI: 10.1109/CPRE48231.2021.9429718.
Spada, Eric et al.: "Time Sync—Redundant Grandmaster Clock Support"; Bd. 802.1; Nr. v1; published: May 14, 2013; pp. 1-10; XP068050436.
Brunner, Christoph et al.; "Smarter time sync: Applying the IEEE PC37.238 standard to power system applications"; Protective Relay Enginers; 2011 64th annual conference for; published: Apr. 11, 2011; pp. 91-102; XP031972549; DOI: 10.1109/CPRE.2011.6035608; ISBN: 978-1-4577-0494-9.

* cited by examiner

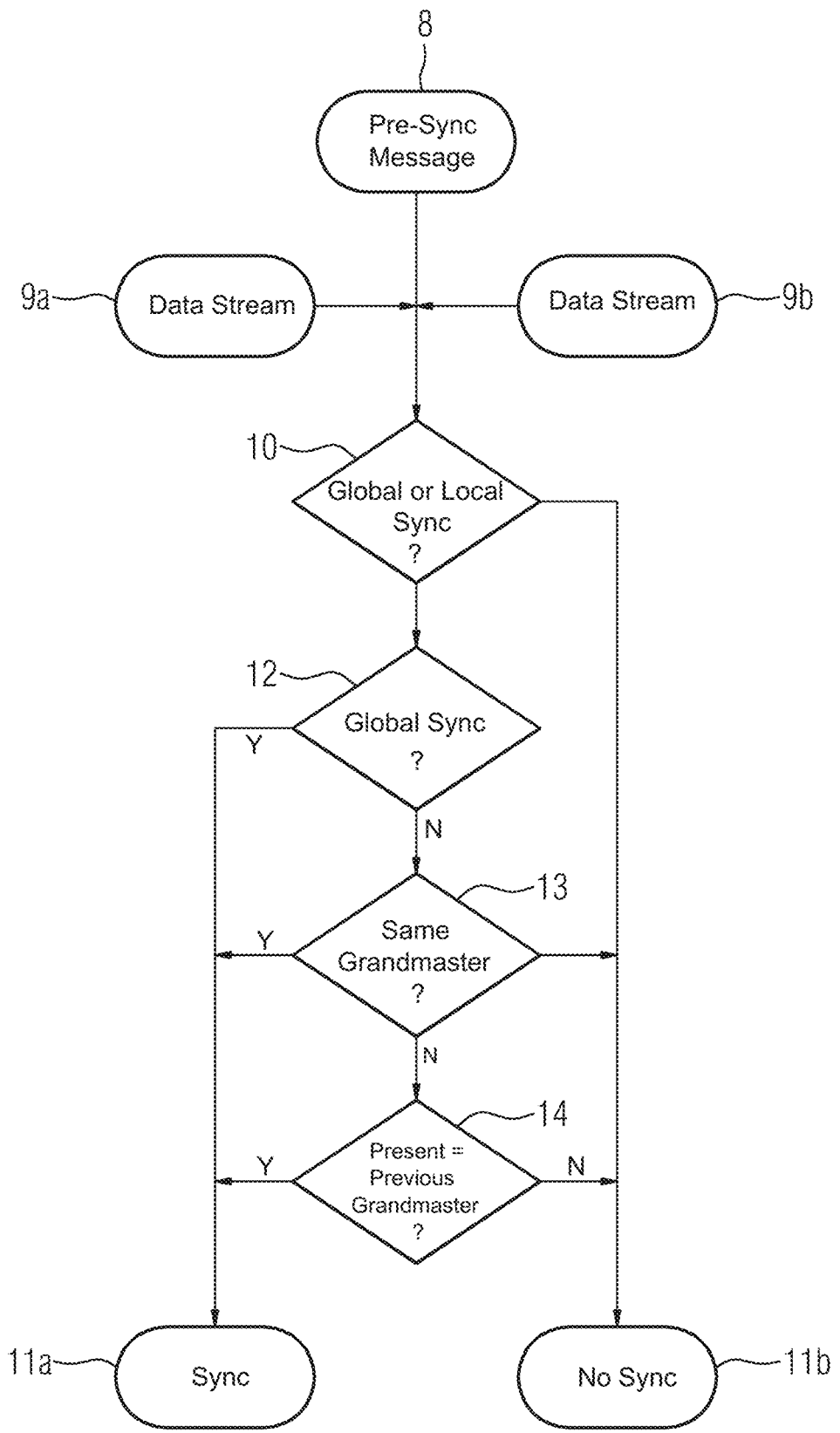

METHOD FOR AVOIDING FUNCTION DISABLEMENTS FOR INTELLIGENT ELECTRONIC UNITS

CROSS-REFERENCE TO RELATED APPLICATION

This application claims the priority, under 35 U.S.C. § 119, of European Patent Application EP 23190098.6, filed Aug. 7, 2023; the prior application is herewith incorporated by reference in its entirety.

FIELD AND BACKGROUND OF THE INVENTION

To synchronize the timing of devices that are connected to one another via a communication network to form a network, a time protocol has been introduced. The protocol is referred to as the Precision Time Protocol and is hereinafter referred to as the PTP.

For example, a local area network is implemented in electrical power supply substations. Such substations are used to lower or raise the mains voltages prevailing in the supply grid by means of a transformer whose mode of operation is known. In addition to a transformer, substations have switching units such as circuit breakers that, after receiving a switching signal, disconnect conductor outgoers of the substation from the rest of the supply grid.

These switching signals are generated by protection and automation devices that monitor the current and voltage characteristics in the conductors of the substation for the presence of fault conditions. If there is a fault condition, a switching signal is generated and transmitted to one or more selected switching units so that the switching units are moved to their disconnect position. In the disconnect position, the contacts of the selected switching units are separated from one another, preventing a flow of current via the switching units. A conductor run connected to one contact of said switching unit is then disconnected from the rest of the supply grid, which is connected to the other contact of said switching unit.

In order for the protection and automation devices to be able to monitor the current and voltage characteristics in the conductors of the substation for the presence of fault conditions, they must be continuously supplied with time-dependent current and voltage values. To provide these current and voltage values, there is provision for current and voltage transformers that record current and voltage in the conductors at a measuring point of the substation and provide a calibrated measurement signal on the secondary side, which signal is sampled at a specified sampling rate to obtain samples. The samples are then digitized. In addition, a time stamp is permanently assigned to the samples. This is done by means of so-called "merging units" or using other intelligent electronic devices (IEDs) in the substation. In order to be able to compare the measured values with one another, the time recording of the IEDs connected to one another via a process bus must be synchronized. This is accomplished using said PTP (Precision Time Protocol).

The protocol PTP is thus used in digital electrical power supply substations to synchronize intelligent electronic devices (IEDs), for example in the so-called IEC 61850 process bus.

The comparability of the measured values originating from different IEDs is critical. Lost or insufficient time synchronization between these devices leads to the protection functions in the protection and automation devices being disabled or to a switching unit being erroneously tripped, with unintended interruption of the power supply as a result.

A digital substation typically produces a digital process bus environment. Current and voltage in the high-voltage conductors is measured for example using current and voltage transformers that provide analog measured values on the output side. These analog measured values are separated from the protection device on the digital side by a special device referred to by those skilled in the art as a merging unit (MU). A merging unit provides a digital stream of samples. This data stream contains data telegrams that typically comply with the IEC 61850-9-2 standard. The protection device, which assumes the role of a data telegram receiver, or sampled value subscriber (SV-SUB), in the digital network, registers for a multiplicity of data streams of different MUs, converts the data streams by way of digital filtering, rates the quality and synchronization attributes of the data and makes the converted data available to the protection or other functional algorithms.

In addition to data streams transmitted by devices in the same digital network, a protection device can receive other digital data streams, for example originating from another, more remote substation. Such a procedure is required for line differential protection, for example. The data streams from different sources can be combined almost freely as inputs for protection devices. However, the algorithms of the protection functions make great demands on the accuracy of the sampling synchronization at their inputs, since inaccurate sampling of analog measured values can lead to an error in the protection function.

For example, a differential protection system thus checks that the sum of the currents measured on all sides of a protection object in the fault-free state is equal to zero. Erroneous synchronization leads to a phase difference between the measured data streams and thus to an apparent differential current. This can lead to false tripping. Even in the case of distance protection, incorrect synchronization of the measured value acquisition between current and voltage leads to an incorrect impedance.

If there is any doubt about the accuracy of the synchronization of the incoming data streams, the function of the IEDs will be disabled. For example, protection devices lose their protection function. In general, the function of IEDs can be disabled as a result of the detection of step changes in the synchronization time base. Checking the identity of the synchronization source can also produce the same result.

To ensure the required synchronization accuracy, a common synchronization source is used for all devices that are involved. The preferred synchronization method described in the IEC 61850 standard is the IEEE 1588 Precision Time Protocol (PTP). To maintain protection functionality in the event of the synchronization source malfunctioning, multiple redundant synchronization sources such as PTP grandmaster clocks (GMC) or grandmaster timer units are typically used. According to the IEEE 1588 protocol, a so-called best master clock algorithm (BMCA) ensures that one of the timing units assumes the role of the active PTP grandmaster and serves as a synchronization source. This timing unit is hereinafter referred to as the grandmaster timing unit. The grandmaster timing unit is selected in decentralized fashion on the basis of the PTP dataset properties within the timing unit.

Disabling of the function of IEDs is undesirable and should therefore be avoided whenever possible.

SUMMARY OF THE INVENTION

It is accordingly an object of the invention to provide a method and a device which overcome the above-mentioned disadvantages of the heretofore-known devices and methods of this general type and which provide for a method in which the occurrence of disabling of the function of IEDs can be reduced or even completely avoided.

With the above and other objects in view there is provided, in accordance with the invention, a method for avoiding function disablements of intelligent electronic units (IEDs) that are connected to one another as part of a local network and via the local area network, the local area network having at least two timing units, the method comprising:

assuming, by one of the timing units, an active grandmaster role as a synchronization source, while all other timing units remain in a slave state and synchronize with the one timing unit being the grandmaster timing unit having the active grandmaster role;

when one of the other timing units changes from the slave state to the role of the grandmaster timing unit, notifying all IEDs in the local network via the local network, using a pre-synchronization message stating whether the presently active grandmaster timing unit was synchronized and, if applicable, with which previously active grandmaster timing unit the presently active grandmaster timing unit was synchronized, in order to avoid a function disablement of the IEDs that process data streams whose samples have been acquired in sync with the previously active grandmaster timing unit.

The invention recognizes that a disablement of the function may be unnecessary when the synchronization source is changed. This is the case when the grandmaster role changes between timing units that are synchronized with one another.

The present invention proposes methods for avoiding function disablements for intelligent electronic units IEDs that are connected to one another as part of a local network and via the local area network. The local area network has multiple and therefore at least two timing units. One of these timing units serves as a synchronization source and assumes an active grandmaster role. All other timing units remain in their slave state and synchronize with the timing unit in the grandmaster role. When one of the timing units in the slave state changes to the role of the grandmaster timing unit, a pre-synchronization message is transmitted to all IEDs of the local network. The pre-synchronization message notifies the IEDs whether and, if applicable, with which previous grandmaster timing unit the present grandmaster timing unit was synchronized. Thus, if the IEDs handle data streams that are synchronized with the previous synchronization source or the present synchronization source, there can be no disablement of the function of the IEDs because these data, although provided with time stamps from different sources, are synchronized with one another. The invention therefore allows disablements of the function of IEDs to be avoided.

The invention also relates to an arrangement for avoiding function disablements for intelligent electronic units, IEDs, having a local area network comprising the IEDs and at least two timing units and also a communication network via which the IEDs and the timing units are connected to one another, wherein the timing units are set up to assume a grandmaster role, in which they serve as a synchronization source for the IEDs, or a slave state, in which they synchronize with a timing unit in the grandmaster role, wherein the timing units are configured such that, when one of the timing units in the slave state changes to the role of the grandmaster timing unit, it notifies all IEDs in the local network via the network, using a pre-synchronization message, whether and, if applicable, with which previous grandmaster timing unit the present grandmaster timing unit was synchronized, so that a disablement of the function of the IEDs that process data streams whose samples have been acquired in sync with the previous grandmaster timing unit is avoided.

A timing unit can be of basically any design for the purposes of the invention. A timing unit in the context of the invention is intended to be understood to mean any unit capable of producing a time standard. This unit may be present as a separate device or else may be a component or part of another device, for example an IED, in particular a protection or automation device. The timing unit can have its own oscillator. Such an oscillator has, for example, a quartz crystal whose oscillations are converted into a time standard. Oscillators are known to those skilled in the art, however, and so there is no further need to go into their exact manner of operation at this juncture. The oscillator used in a timing unit can be synchronized with another oscillator in the invention.

Advantageously, the invention involves the BMCA being executed in the network. Depending on the result of this test, a timing unit will change to the grandmaster role or remain in the slave state.

If a timing unit is faulty, the BMCA detects this and triggers a change of grandmaster role. Advantageously, the invention involves a restored or reconnected grandmaster-capable timing unit being forced into its slave state until its own internal oscillator is synchronized with that of the present PTP grandmaster timing unit, if available. Only then is an enforcement of the slave state lifted. The BMCA then determines whether this restored and synchronized timing unit accepts the grandmaster role. In this way, too, a jump in time is avoided.

The slave state can be enforced by setting the priority of said timing unit. If the priority of a grandmaster-capable timing unit is set to, for example, 254 or 255, it will remain in its slave state for a check by the BMCA. This procedure can be carried out in the invention in addition to sending a pre-synchronization message.

For the purposes of the invention, a local area network, referred to as a "LAN" for short, is intended to be understood to mean a spatially delimited network. For example, the local area network is a network defined in IEC standard IEC 61850. Advantageously, the local area network has structured cabling. According to a preferred variant, the network is a process bus communication network. The spatially delimited network comprises intelligent electronic devices (IEDs) that are connected to one another for example by wired communication lines or radio, e.g. 5G radio networks. However, the use of Ethernet technology is preferred in the invention. In principle, however, other local area networks are also possible in the context of the invention.

The acronym IED is intended to be understood in the invention to mean an intelligent electronic device. The IED is, for example, a protection or automation device, a relay or a field control device that is used for example in the field of protection and control engineering in substations. An IED is often also referred to as a processor-based controller.

Disabling of a function in the context of the invention is intended to be understood to mean that a function for which the IED is designed is not performed in the event of disabling for as long as the disabling exists. If the IED is a protection device, for example, a protection function of the protection device is disabled. Such a protection function comprises a protection algorithm of the protection device that is used in the protection device. The invention can also involve all protection functions of a protection device being disabled. Other IEDs can have a different function or serve a different purpose. In the event of the function of an automation device, which is also an IED for the purposes of the invention, being disabled, the activities that are otherwise automatically performed by the automation device, for example, cannot be launched for the duration of the disabling.

In accordance with an advantageous feature of the invention, a Precision Time Protocol PTP being used.

According to another practical variant, the local area network is a radio network. In particular, advantages arise when the radio network is a 5G radio network.

According to a preferred configuration of the invention, the local area network comprises a process bus communication network of a substation. Ethernet technology is preferably used in the process bus communication network.

The number of timing units is not limited to two timing units in the invention. For example five or more timing units can thus also communicate with one another in the network.

Conveniently, at least one timing unit is integrated or, in other words, installed in an IED. It is therefore part of the IED and arranged in the housing thereof.

Further advantages arise if at least one IED is a protection or automation device of an electrical power supply grid. Furthermore, an MU may be an IED for the purposes of the invention.

In one variant of the invention, the pre-synchronization message is a binary pre-synchronization message. The term binary pre-synchronization message is intended to be understood to mean that the pre-synchronization message provides information about the pre-synchronization state in the form of binary information. The binary pre-synchronization message merely indicates whether pre-synchronization was successful. The identity of the synchronization source is not indicated in this case. In this simple and therefore inexpensive variant of the invention, it is assumed that there are only two synchronization sources (PTP-GMCs) in the network. In other words, an indication of whether the present grandmaster timing unit was synchronized with the previous grandmaster timing unit is provided. If the binary pre-synchronization information is true, it leads to an otherwise intended check on the synchronization identity being temporarily deactivated. Otherwise, the check on the synchronization identity remains active.

This, too, allows disabling of the function to be avoided.

In principle, it is discretionary in the invention which unit sends the pre-synchronization message to the IEDs of the local network. Advantageously, however, it is done by an IED or a timing unit, which detect the change of grandmaster role as a result of the check on the synchronization identity. Such a timer unit may be the timing unit that has changed to the role of grandmaster. However, the invention can also involve the pre-synchronization message being sent by another timing unit that has not changed to the grandmaster role. Further advantages arise when the timing unit sends the pre-synchronization message at the time at which it changes to the role of grandmaster timing unit. This variant avoids a delay when sending the pre-synchronization message.

Advantageously, the pre-synchronization message comprises the identity of the present grandmaster timing unit, the identity of the previous grandmaster timing unit and a statement indicating whether the present grandmaster timing unit and the previous grandmaster timing unit were synchronized with one another. In this case, a successfully pre-synchronized synchronization source, i.e. in other words the present grandmaster timing unit, can notify the IEDs of its own synchronization identity and the synchronization identity of the synchronization source with which it has been synchronized. The IEDs can use both values to check the synchronization identity of incoming data streams because they are based on the same time base. Disabling of the protection function can be avoided if the grandmaster identity transmitted by an MU in each data telegram corresponds to one of the grandmaster identities transmitted in the pre-synchronization message and pre-synchronization was successful.

In another variant according to the invention, each pre-synchronization message is transmitted as a GOOSE message. GOOSE messages are known to those skilled in the art from the standard IEC 61850-8-1. GOOSE is an acronym that stands for "generic object-oriented station event" messages. GOOSE messages can be sent by the grandmaster timing unit, IEDs that are in the form of MUs, or by protection devices with a built-in GMC function.

In a variant modified from this, each pre-synchronization message is sent by a grandmaster timer unit when it assumes the grandmaster role, said grandmaster timer unit being incorporated in the local network as a separate unit.

As a departure from this, the invention is also applicable where the present grandmaster timer unit is a function block that is integrated in an IED. If the grandmaster timer unit is in the form of a function block and is installed as such in an IED and if it is also intended to send the pre-synchronization message, then the pre-synchronization message is preferably transmitted in the form of a GOOSE message. The GOOSE mechanism is typically already used for other purposes by the IED in which said grandmaster timing unit is installed.

According to one further development that is appropriate in this regard, the pre-synchronization message comprises a type-length-value (TLV) field. TLVs are used in the PTP protocol described above and are known to those skilled in the art in this field. Further information about these can therefore be dispensed with at this juncture.

Advantageously, the IEDs comprise multiple merging units (MUs) and at least one protection device.

The pre-synchronization message advantageously expires after a predefined time.

According to another variant, a first timing unit is forced into its slave state when another timing unit in the grandmaster role has been detected in the local area network, wherein the first timer unit synchronizes with the timing unit in the grandmaster role, the enforcement of the slave state for the first timing unit is lifted after synchronization has been achieved, and the first timing unit changes to the role of the grandmaster timing unit if it is better suited to the grandmaster role, or remains in its slave state if another timing unit in the network is better suited to the grandmaster role. This, too, allows disabling of the function of IEDs to be avoided, since the timing units that alternate in the grandmaster role are always synchronized with one another.

According to one further development that is appropriate in this regard, a grandmaster-capable timing unit that is available again or connected to the network again remains in the slave state and continually synchronized with the present grandmaster timing unit. It changes to the grandmaster role only when the grandmaster timing unit is removed.

The method according to the invention is advantageously a computer-implemented method or in other words a method carried out by a computer.

Other features which are considered as characteristic for the invention are set forth in the appended claims.

Although the invention is illustrated and described herein as being embodied in a method for avoiding function disablements for intelligent electronic units (IEDs), it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

FIG. 2 shows a flowchart to illustrate an exemplary embodiment of the method according to the invention.

DETAILED DESCRIPTION OF THE INVENTION

Figure 1:
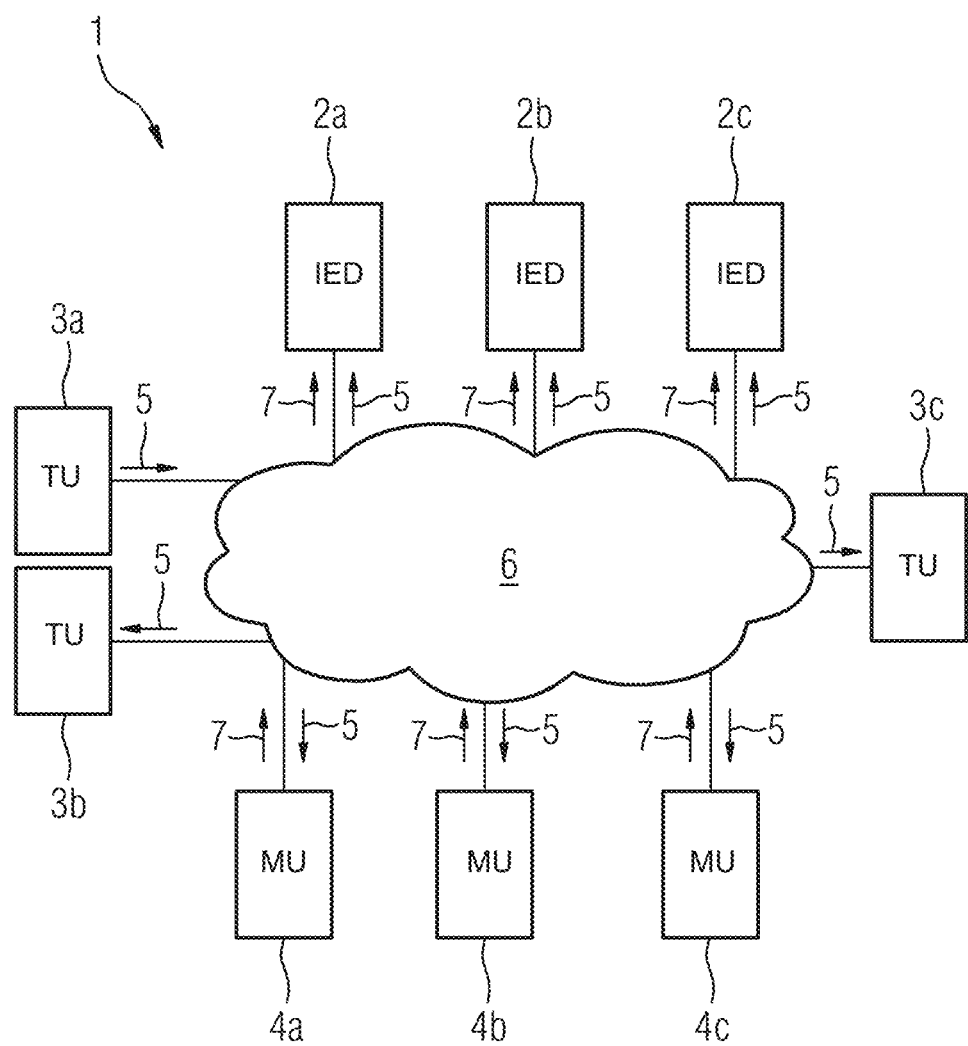
FIG. 1 shows an exemplary embodiment of a process bus communication network.

Referring now to the figures of the drawing in detail and first, in particular, to FIG. 1 thereof, there is shown a local area network 1 by way of illustration. The network 1 has protection devices 2a, 2b and 2c as IEDs. The IEDs also comprise so-called merging units (MUs) 4a, 4b and 4c. Timing units (TUs) are referenced by the reference signs 3a, 3b and 3c. As already mentioned earlier, a BMCA ensures that the timing unit 3a assumes the role of grandmaster. The timing units 3b, 3c are in the slave state.

In the exemplary embodiment shown, the timing units 3a can use a communication process bus 6 to transmit PTP synchronization messages based on the predetermined structure "Announce", "Sync" and "Follow_Up" to the IEDs, that is to say the protection devices 2a, 2b and 2c, and the MUs 4a, 4b and 4c, which are also connected to the process bus communication network 6.

The timing units 3 may be in principle connected to a primary reference clock source—the so-called primary reference clock (PRC)—e.g. to the global navigation satellite system (GNSS). However, due to their ability to be influenced by jamming or other means (e.g. spoofing), such satellite-based global reference clock sources pose a risk and often cannot be used depending on their field of application. In such a case, a device-internal oscillator can be used that is installed in the timing units 3. The timing units then specify a relative time reference in the form of time values in the process bus communication network 6 independently of the outside.

Relative time values provided by the local oscillator in the timing units 2, 3 are sufficient for synchronization when a process bus communication network 6 is used in a substation of an electrical power supply grid, since no absolute time values are required.

The use of multiple timing units is used for redundancy, that is to say for availability purposes. A single timing unit 3a is selected as the active grandmaster under failure-free conditions using the best master clock algorithm (BMCA). Only this unit transmits PTP synchronization messages 5 via the network 6. The other timing units 3b and 3c do not transmit PTP synchronization messages and are in the slave state. Like the IEDs 2 and 4, they receive PTP synchronization messages 5 from the grandmaster timing unit 3a and synchronize their own internal oscillator according to the oscillator of the timing unit 3a, so that the internal oscillator of the timing unit 3b, 3c oscillates almost at the same speed as the internal oscillator of the timing unit 3a. The timing units 3b and 3c are ready to switch to an active grandmaster role, however.

FIG. 1 also shows that the protection devices 2 receive a stream of data telegrams, or in other words a data stream 7. Each data stream 7 is provided by the MUs 4 on the output side. The MUs 4 receive, on the input side, measured values from current or voltage measuring devices that record a current or the voltage of a high-voltage conductor or a component in an electrical power supply grid. For this purpose, the MUs are connected to the current or voltage measuring devices. These current or voltage measuring devices are not shown in the figures for reasons of clarity. If the measured values at the input of the MUs are analog, each MU samples the analog signals to obtain samples. The samples are digitized by means of an analog-to-digital converter to obtain digital measured values. To produce data telegrams, the digital measured values are provided with a time stamp tx, where x represents a serial integer as an index. In order to be able to compare the digital measured values of the MU 4a with those of the MU 4b or 4c, the MUs must be synchronized with one another. This is done using PTP synchronization messages.

If the grandmaster timing unit 3a malfunctions, the grandmaster role transfers e.g. to the timing unit 3c. This is determined by the BMCA. Since the timing unit 3c was synchronized with the timing unit 3a, there is no loss of synchronization. If the timing unit 3a is functional again or connected to the network 1 again, a previously implemented algorithm stops the direct acceptance of the grandmaster role by the timing unit 3a. The timing unit remains in the slave state and synchronizes with the grandmaster timing unit 3c. Once synchronization has been achieved, the enforcement of the slave state is lifted by said algorithm again. The BMCA then determines the fate of the timing unit 3a.

If the timing unit 3a has malfunctioned or if it is disconnected from the network, its absence is detected by the timing units 3b and 3c due to the absence of PTP Announce messages from the timing unit 3a. According to the BMCA, e.g. the timing unit 3c changes to the grandmaster role. If the timing unit 3c has detected the change, it directly, or in other words immediately, transmits a pre-synchronization message to the protection devices 2 with the corresponding content that it was synchronized with the timing unit 3a prior to changing to the grandmaster role.

The IEDs 2, 4 detect the change of grandmaster from the timing unit 3a to the timing unit 3c on the basis of the PTP messages. The time synchronization of the IEDs is not disrupted here if the internal oscillator of the timing unit 3c was synchronized with the oscillator of the timing unit 3a prior to the switch. Synchronization of the time recording among the IEDs continues smoothly. There is no jump in time during or after the grandmaster switch.

The IEDs 2, 4 do not detect a jump in time after the acceptance and do not need to synchronize their internal oscillator with the new local oscillator of the new grandmaster timing unit 3c. Such a re-synchronization process can take up to 20 seconds. During this time, the protection devices 2 would disable their protection functions to prevent circuit breakers from possibly being erroneously tripped.

FIG. 2 illustrates the flowchart for an exemplary embodiment of the method according to the invention. The method shown is carried out in the protection devices 2 (2a, 2b, 2c) shown in FIG. 1. Each of the protection devices 2 compares all of its incoming data streams. For this purpose, two data streams, which can originate from different MUs, are always compared with one another at a certain time by the method according to the invention. This procedure is repeated until all data streams received by the respective protection device have been compared with one another. FIG. 2 therefore shows two data streams 9a and 9b, which originate from the MUs 4a and 4b. The procedure is carried out to decide whether the MUs 4a and 4b are synchronized with one another. If this is the case, the protection function of the protection devices 2 is continued; otherwise, it would have to be disabled.

The protection devices 2 receive the pre-synchronization message 8 and two data streams 9a and 9b from the MUs 4a and 4b. According to the standard IEC 61850-9-2, the data telegrams of the data streams 9a and 9b contain information about the synchronization time source (global, local or IED-internal) and the identity of the grandmaster timer unit. This information is conveyed by the attributes "smpSynch" and "gmIdentity". Pre-synchronization message 8 contains the statement indicating whether the present grandmaster timing unit was successfully synchronized with the previous grandmaster timing unit before the grandmaster role change. The pre-synchronization message also comprises the identity of the present grandmaster timing unit and the identity of the previous grandmaster timing unit.

The first step 10 comprises testing whether the MUs 4a and 4b are globally or locally synchronized. If one MU were globally synchronized and the other were locally synchronized or at least one MU were synchronized in IED-internal fashion, then the MUs 4a and 4b would use different time bases. They would therefore not be synchronized with one another. This would correspond to the result 11b "not synchronized". The result 11a of this test procedure is "synchronized", in other words the data streams of the two MUs 4a and 4b are synchronized with one another. In order to be able to confirm that synchronization exists, however, further test steps must be carried out.

Test step 12 comprises determining whether the MUs 4a and 4b are both globally synchronized. If this is the case, the MUs use the same global time base; the test finishes with the result 11a "synchronized". If the two data streams are not both globally synchronized, they must both be locally synchronized in view of the result of test step 10.

Test step 13 comprises testing whether the MUs 4a and 4b are synchronized with the same PTP grandmaster clock. If this is the case, the MUs use the same time base and are synchronized with one another. The result of the test is 11a "synchronized". However, if it is found that the MUs 4a and 4b are synchronized with different grandmaster timing units, another final test step must be performed.

The fourth test step 14 comprises testing whether these different grandmaster timing units are the present and previous grandmaster timing units. If so, and pre-synchronization was successful, both use the same time base. The MUs 4a and 4b are synchronized with one another in this case. Test step 14 is performed using pre-synchronization message 8. The two MUs 4a and 4b are synchronized with one another if, for example, the present grandmaster timing unit 3c was synchronized with the previous grandmaster timing unit 3a before the change of grandmaster role (pre-synchronization) and the two MUs 4a and 4b are synchronized with either the present or the previous grandmaster timing unit. The result is then 11a "synchronized," otherwise 11b "not synchronized."

The test step 14 can thus reliably avoid a disablement of the protection function of the respective protection device, which would have occurred according to previously known methods.

The invention claimed is:

1. A method for avoiding function disablements of intelligent electronic units (IEDs) that are connected to one another as part of a local network and via the local area network, the local area network having at least two timing units, the method comprising:
   assuming, by one of the timing units, an active grandmaster role as a synchronization source, while all other timing units remain in a slave state and synchronize with the one timing unit being the grandmaster timing unit having the active grandmaster role;
   when one of the other timing units changes from the slave state to the role of the grandmaster timing unit, notifying all IEDs in the local network via the local network, using a pre-synchronization message stating whether the presently active grandmaster timing unit was synchronized and, if applicable, with which previously active grandmaster timing unit the presently active grandmaster timing unit was synchronized, in order to avoid a function disablement of the IEDs that process data streams whose samples have been acquired in sync with the previously active grandmaster timing unit.

2. The method according to claim 1, wherein the pre-synchronization message is a binary pre-synchronization message.

3. The method according to claim 1, which comprises transmitting the pre-synchronization message by a grandmaster timing unit or an IED.

4. The method according to claim 1, wherein the pre-synchronization message comprises an identity of the presently active grandmaster timing unit, an identity of the previously active grandmaster timing unit and a statement indicating whether the presently active grandmaster timing unit and the previously active grandmaster timing unit were synchronized with one another.

5. The method according to claim 1, which comprises transmitting the pre-synchronization message as a Generic Object-Oriented Station Event (GOOSE) message.

6. The method according to claim 1, which comprises sending the pre-synchronization message in the form of a Precision Time Protocol (PTP) message which comprises a type-length-value field.

7. The method according to claim 1, which comprises sending the pre-synchronization message by a grandmaster timing unit upon assuming the grandmaster role, wherein the grandmaster timing unit is incorporated in the local network as a separate unit.

8. The method according to claim 1, wherein the presently active grandmaster timing unit is a function block integrated in an IED.

9. The method according to claim 1, wherein the IEDs comprise multiple MUs and at least one protection device.

10. The method according to claim 1, which comprises:
   forcing a first timing unit into the slave state when another timing unit in the grandmaster role has been detected in the local area network, with the first timing unit synchronizing with the timing unit in the grandmaster role;
   lifting an enforcement of the slave state for the first timing unit after synchronization has been achieved; and
   when the first timing unit is better suited to the grandmaster role than other timing units in the network, the first timing unit changes to the role of the grandmaster timing unit, or when another timing unit in the network is better suited to the grandmaster role, the first timing unit remains in the slave state.

11. The method according to claim 1, wherein a grandmaster-capable timing unit that is available again or connected to the network again remains in the slave state and continually synchronizes with the present grandmaster timing unit and changes to the grandmaster role only when the grandmaster timing unit is removed.

12. An arrangement for avoiding function disablements for intelligent electronic units (IEDs), the arrangement comprising:
a local area network comprising the IEDs and at least two timing units, and a communication network connecting the IEDs and the timing units to one another;
said timing units being configured to selectively assume a grandmaster role, wherein said timing units serve as a synchronization source for said IEDs, or a slave state, wherein said timing units synchronize with a timing unit having the grandmaster role;
at least one of said IEDs or timer unit being configured such that, when one of said timing units in the slave state changes to the grandmaster role of a grandmaster timing unit, said one timing unit notifies all IEDs in the local network via the communication network, by way of a pre-synchronization message, whether the present grandmaster timing unit was synchronized with the previously active grandmaster timing unit, in order to avoid a disablement of the function of said IEDs that process data streams whose samples have been acquired in sync with the previously active grandmaster timing unit.

13. A non-transitory computer program product comprising commands that, when the program is executed by a computer, cause said computer to carry out a method according to claim 1.

* * * * *